(12) United States Patent
Uemura et al.

(10) Patent No.: US 6,504,277 B2
(45) Date of Patent: Jan. 7, 2003

(54) MOTOR HAVING WORM AND WORM WHEEL

(75) Inventors: Keiichi Uemura, Kariya (JP); Toshio Yamamoto, Kosai (JP)

(73) Assignee: Asmo Co., Ltd., Shizuoka (JP)

( * ) Notice: Subject to any disclaimer, the term of this patent is extended or adjusted under 35 U.S.C. 154(b) by 1 day.

(21) Appl. No.: 09/801,708

(22) Filed: Mar. 9, 2001

(65) Prior Publication Data

US 2002/0047407 A1 Apr. 25, 2002

(30) Foreign Application Priority Data

Mar. 31, 2000 (JP) ........................................ 2000-097653

(51) Int. Cl.[7] ............................................. H02K 7/102
(52) U.S. Cl. .......................... 310/77; 310/75 R; 310/90
(58) Field of Search ................. 310/77, 75 R, 310/90

(56) References Cited

U.S. PATENT DOCUMENTS 3,088,043 A * 4/1963 Graham ....................... 310/77
4,129,797 A * 12/1978 Lindner ....................... 310/77
6,215,209 B1 * 5/2002 Yamamoto ................ 310/75 R

FOREIGN PATENT DOCUMENTS

| JP | A-5-56601 | 3/1993 |
| JP | A-10-164796 | 6/1998 |
| JP | A-10-210708 | 8/1998 |
| JP | A-11-98765 | 4/1999 |
| JP | A-11-178277 | 7/1999 |

* cited by examiner

Primary Examiner—Burton S. Mullins
(74) Attorney, Agent, or Firm—Law Offices of David G. Posz

(57) ABSTRACT

A rotor of a motor includes an engaging portion that engages an annular portion of a yoke based on movement of a rotatable shaft in a thrust direction to brake the rotatable shaft. There is provided a Belleville spring that limits the movement of the rotatable shaft in the thrust direction to prevent engagement of the engaging portion with the annular portion when a thrust load applied on the rotatable shaft is equal to or smaller than a predetermined value. Furthermore, the Belleville spring allows the movement of the rotatable shaft in the thrust direction to allow the engagement of the engaging portion with the annular portion when the thrust load applied on the rotatable shaft is larger than the predetermined value.

9 Claims, 3 Drawing Sheets

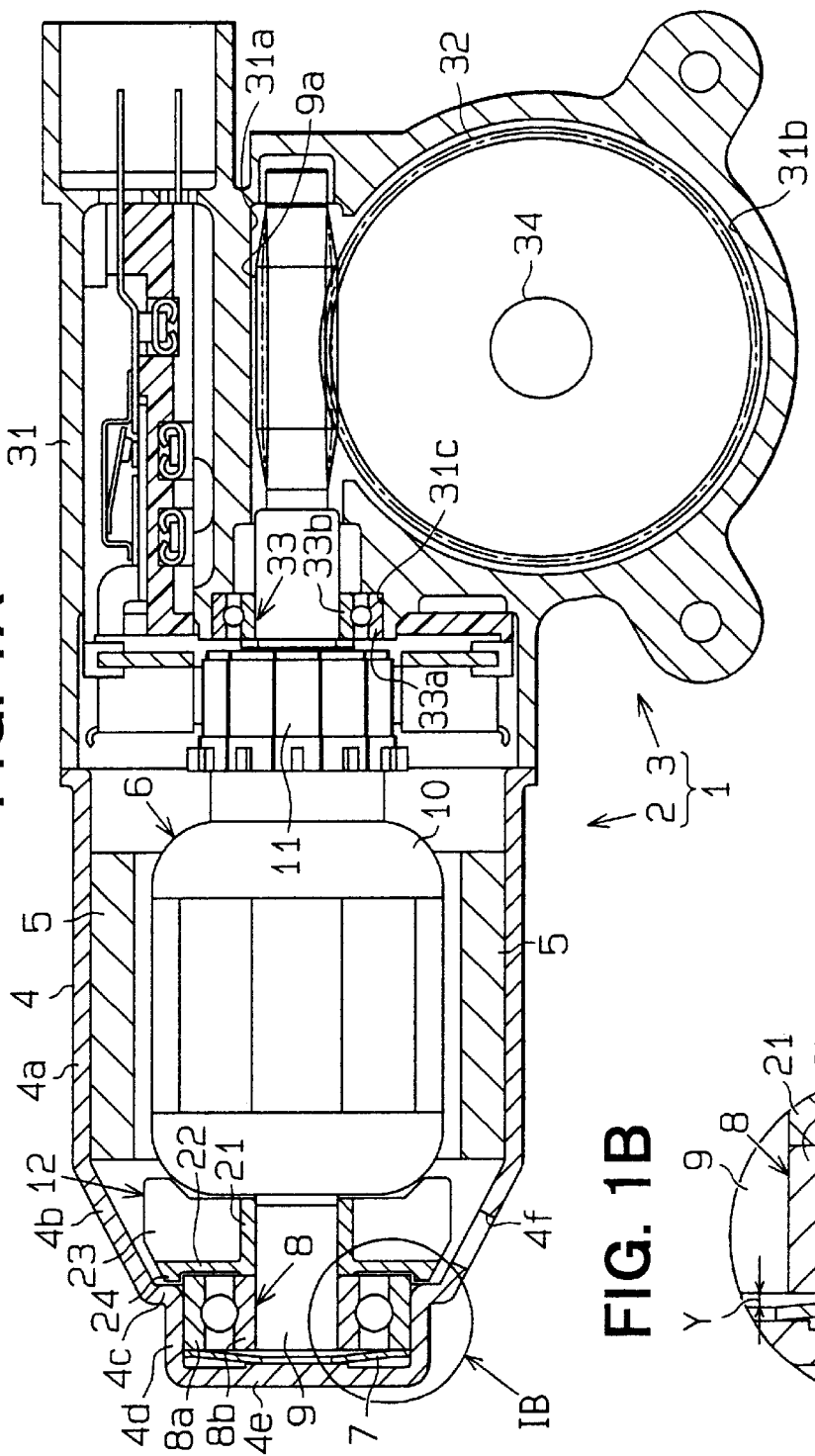
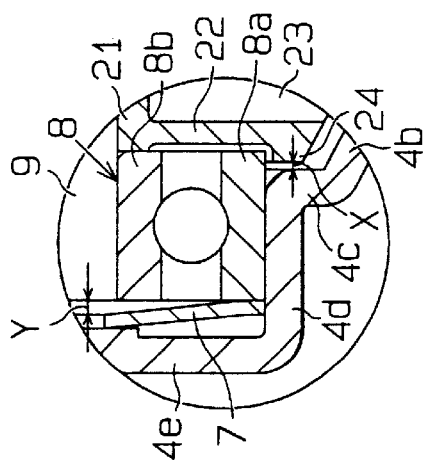
FIG. 1A
FIG. 1B

MOTOR HAVING WORM AND WORM WHEEL

CROSS REFERENCE TO RELATED APPLICATION

This application is based on and incorporates herein by reference Japanese Patent Application No. 2000-97653 filed on Mar. 31, 2000.

BACKGROUND OF THE INVENTION

1. Field of the Invention

The present invention relates to a motor having a worm and a worm wheel.

2. Description of Related Art

As shown in FIG. 5, one previously proposed motor includes a motor main body 81 and a speed reducing unit 82 secured to the motor main body 81. The motor main body 81 includes a generally cylindrical yoke housing 83. The motor main body 81 further includes a rotor 84 substantially contained in the yoke housing 83. The rotor 84 includes a rotatable shaft 85, an armature 86 secured to the rotatable shaft 85, and a commutator 87. A base end portion of the rotatable shaft 85 is rotatably supported by a radial bearing 88 arranged at a base of the yoke housing 83. In a base end surface of the rotatable shaft 85, there is formed a ball receiving recess 85a in which a metal ball 89 is partially received. Part of the ball 89 that protrudes from the ball receiving recess 85a engages a bottom wall of the yoke housing 83 to act as a thrust bearing that supports a load exerted in an axial direction of the rotatable shaft 85. A worm 90 is provided at a distal end portion of the rotatable shaft 85.

The speed reducing unit 82 includes a gear housing 91 secured to an open end of the yoke housing 83, a worm wheel 92 contained and rotatably supported in the gear housing 91, and the like. In the gear housing 91, there is formed a shaft receiving recess 91a that receives a portion of the rotatable shaft 85 (worm 90) extending out from the yoke housing 83. A radial bearing 93 is arranged at an open end of the shaft receiving recess 91a. A middle portion of the rotatable shaft 85 is rotatably supported by the radial bearing 93. The worm wheel 92 is meshed with the worm 90 of the rotatable shaft 85.

When the rotor 84 is rotated, a rotational speed of the rotor 84 is reduced through the speed reducing unit 82 (worm 90 and worm wheel 92). Then, the rotational force of the speed reducinq unit 82 is outputted from the motor through an output shaft 94 connected to the worm wheel 92.

The above motor is designed to rotate the worm wheel 92 shown in FIG. 5 only in a counterclockwise direction and is used, for example, as a motor of wiper system.

By way of example, during operation of the wiper system, if there is some resistance, such as a resistance exerted by snow located on a wiping surface of a vehicle front glass, a large load larger than a load normally applied on the output shaft 94 is quickly applied on the output shaft 94 via a link mechanism of the wiper system which links the output shaft 94 to wipers of the wiper system. Thus, a large reaction force is applied on the rotatable shaft 85, thereby causing movement of the rotatable shaft 85 toward its base end side (right side in FIG. 5). However, this movement of the rotatable shaft 85 is limited by the ball 89, so that a large force (rotational force or inertial force of the rotor) is applied on a connection (teeth) between the worm 90 and the worm wheel 92. As a result, in the described motor, each one of the worm 90 and the worm wheel 92 needs to have a large strength that is larger than a normally required strength to avoid damage to the connection (teeth) between the worm 90 and the worm wheel 92. This results in an increase in a material cost of the worm wheel 92. This is especially true when the worm wheel 92 is made of a resin material. Also, this results in a decrease in a motor efficiency due to an increase in the weight of each rotating component. Furthermore, this results in an increase in a gear module, so that the worm wheel becomes bigger. Thus, a size of the entire gear housing needs to be increased.

SUMMARY OF THE INVENTION

Accordingly, it is an objective of the present invention to provide a motor that has a worm and a worm wheel and that can prevent application of a large force on a connection between the worm and the worm wheel.

To achieve the objective of the present invention, there is provided a motor including a motor case, a rotor and a worm wheel. The rotor is contained in the motor case and includes a rotatable shaft. The rotatable shaft has a worm that is meshed with the worm wheel. The motor further includes frictional braking force generating means for braking the rotatable shaft with friction when a thrust load applied on the rotatable shaft exceeds a predetermined value.

BRIEF DESCRIPTION OF THE DRAWINGS

The invention, together with additional objectives, features and advantages thereof, will be best understood from the following description, the appended claims and the accompanying drawings in which:

FIG. 1A is a schematic cross-sectional view for describing a motor according to one embodiment of the present invention;

FIG. 1B is an enlarged cross-sectional view of a section IB encircled in FIG. 1A;

DETAILED DESCRIPTION OF THE INVENTION

Figure 2:
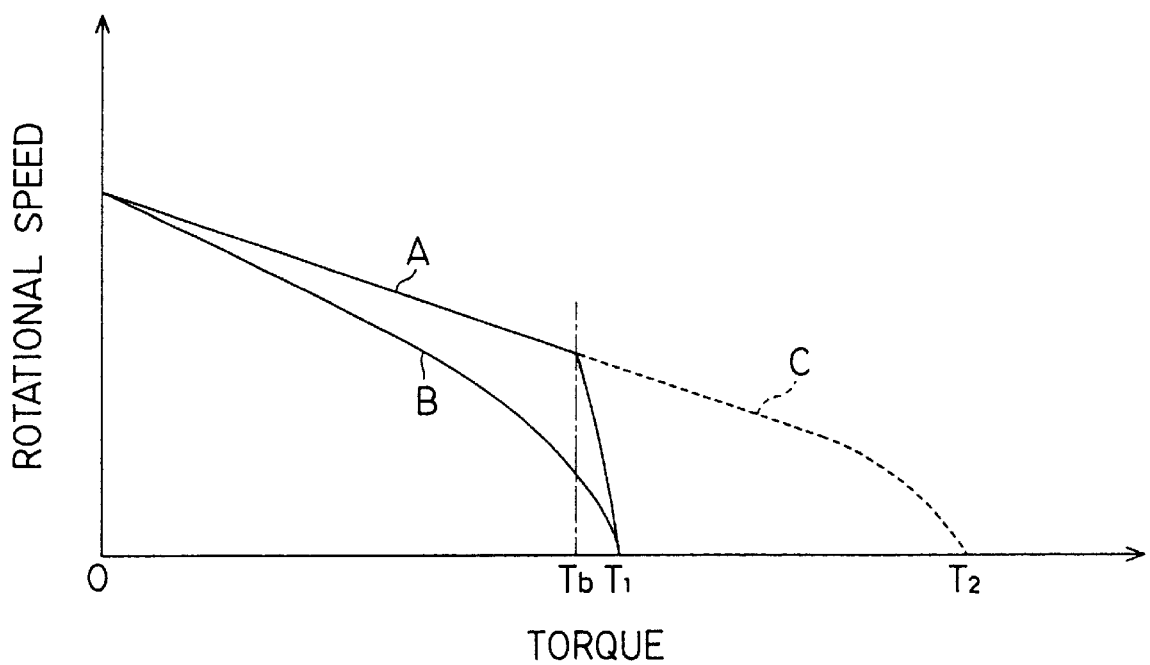
FIG. 2 is a characteristic diagram showing a characteristic relationship between a rotational speed and a torque.

A motor of a window wiper system according to one embodiment of the present invention will now be described with reference to FIGS. 1A, 1B and 2.

As shown in FIG. 1A, the motor 1 has a motor main body 2 and a speed reducing unit 3. The motor main body 2 has a yoke housing (hereinafter simply referred as a yoke) 4, a plurality of magnets 5 secured to an inner peripheral surface of the yoke 4, and a rotor 6 substantially contained within the yoke 4.

The yoke 4 has a cylindrical large diameter portion 4a, a tapered portion 4b, an annular portion 4c, a cylindrical small diameter portion 4d and a bottom portion 4e. The tapered portion 4b extends from an end of the large diameter portion 4a in an axial direction and has a diameter that decreases toward its end. The annular portion 4c acts as a case-side engaging portion extending radially inwardly from an end of the tapered portion 4b. The small diameter portion 4d extends axially from an inner peripheral edge of the annular portion 4c. The bottom portion 4e covers an end of the small diameter portion 4d. A plurality (only one is indicated in the drawing) of vent holes 4f are circumferentially arranged in the tapered portion 4b.

The small diameter portion 4d houses an annular Belleville spring (biasing member) 7 and a ball bearing 8. The Belleville spring 7 and the ball bearing 8 act together as thrust movement adjusting means. An inner peripheral edge portion of the Belleville spring 7 located on one axial side (left side in FIG. 1A) of the Belleville spring 7 engages the bottom portion 4e. The ball bearing 8 is freely movably received within the small diameter portion 4d such that one axial end surface of an outer ring 8a of the ball bearing 8 engages an outer peripheral edge portion of the Belleville spring 7 located on the other axial side (right side in FIG. 1A) of the Belleville spring 7, and an outer peripheral surface of the outer ring 8a slidably engages an inner peripheral surface of the small diameter portion 4d.

The rotor 6 includes a rotatable shaft 9, an armature 10, a commutator 11 and a cooling fan 12 (hereinafter simply referred as a fan). A base end of the rotatable shaft 9 is received and secured in the inner ring 8b of the ball bearing 8 such that the rotatable shaft 9 is supported in a rotatable manner relative to the yoke 4. The armature 10 is secured to a middle portion of the rotatable shaft 9 such that the armature 10 faces the magnets 5. The commutator 11 is secured to a distal end side (distal to the armature 10) of the rotatable shaft 9. Adjacent to the vent holes 4f of the yoke 4, the fan 12 is secured to the base end portion of the rotatable shaft 9 between the ball bearing 8 and the armature 10.

The fan 12 includes a cylindrical portion 21, an annular portion 22, a plurality of blades 23 and an engaging portion 24 that acts as a rotor-side engaging portion. The cylindrical portion 21 has an inner diameter that allows the cylindrical portion 21 to be received around and secured to the rotatable shaft 9. The annular portion 22 has an annular shape and extends radially outwardly from one axial end of the cylindrical portion 21 which is adjacent to the ball bearing 8. An outer diameter of the annular portion 22 is larger than that of the ball bearing 8, so that the engaging portion 24 of the fan 12 is located radially outward of the ball bearing 8. The blades 23 are arranged in a radial pattern and extend from the annular portion 22 in the axial direction on the armature 10 side. The engaging portion 24 protrudes from an outer edge of the annular portion 22 in the axial direction on the annular portion 4c side of the yoke 4. In the present embodiment, the annular portion 4c of the yoke 4, the engaging portion 24 of the fan 12 and the Belleville spring 7 constitute frictional braking force generating means.

With reference to FIG. 1B, in this embodiment, in a relaxed state of Belleville spring 7, a distance X between the engaging portion 24 of the fan 12 and the annular portion 4c of the yoke 4 is smaller than a flexing distance Y of the Belleville spring 7, i.e., the distance Y between the base end surface of the rotatable shaft 9 and the inner peripheral edge of the Belleville spring 7 located on the armature 10 side. That is, when the rotatable shaft 9 moves in an axial (thrust) direction toward the bottom portion 4e of the yoke 4, the engaging portion 24 first engages the annular portion 4c of the yoke 4.

A worm 9a is provided at a distal end side of the rotatable shaft 9 which extends out from an open end of the yoke 4.

The speed reducing unit 3 includes a gear housing 31 and a worm wheel 32. The gear housing 31 is secured to the open end of the yoke 4. The worm wheel 32 is received in the gear housing 31 and is rotatably supported therein. In this embodiment, the yoke 4 and the gear housing 31 together constitute a motor case.

In the gear housing 31, there is formed a worm housing 31a that houses the portion of the rotatable shaft 9 (worm 9a) which extends out from the open end of the yoke 4. Furthermore, in the gear housing 31, right next to a middle portion of the worm housing 31a (below the middle portion of the worm housing 31a in FIG. 1A), there is formed a wheel housing 31b that is communicated with the worm housing 31a and receives the worm wheel 32.

At an open end of the worm housing 31a, there is formed a bearing-receiving recess 31c in which a ball bearing 33 is received. The ball bearing 33 is freely movably received in the bearing-receiving recess 31c such that an outer peripheral surface of an outer ring 33a of the ball bearing 33 slides along an inner peripheral surface of the bearing-receiving recess 31c. Furthermore, the middle portion of the rotatable shaft 9 is received and secured within an inner ring 33b of the ball bearing 33.

The worm wheel 32 is meshed with the worm 9a of the rotatable shaft 9. An output shaft 34 is secured to a center of the worm wheel 32. The output shaft 34 is connected to vehicle wiper blades (not shown) via an undepicted link mechanism. The motor 1 is secured to a vehicle body in such a manner that when the worm wheel 32 (output shaft 34) rotates in a clockwise direction in FIG. 1A, the wiper blades are driven to wipe the vehicle front glass.

In this embodiment, the rotatable shaft 9 can move in the axial (thrust) direction from one end position whereat the outer ring 33a of the ball bearing 33 engages a bottom of the bearing-receiving recess 31c to other end position whereat the engaging portion 24 of the fan 12 engages the annular portion 4c of the yoke 4. A spring constant of the Belleville spring 7 is chosen such that the engaging portion 24 does not engage the annular portion 4c while the thrust load applied on the rotatable shaft 9 toward the bottom portion 4e of the yoke 4 being equal to or smaller than a predetermined value and engages the annular portion 4c while the thrust load being larger than the predetermined value. The Belleville spring 7 biases the rotatable shaft 9 via the ball bearing 8. In the present embodiment, the above predetermined value of the thrust load can be adjusted to any desired value, for example, by appropriately choosing the distances X and Y as well as the spring constant of the Belleville spring 7.

In the thus constructed motor 1, when the rotor 6 is driven to rotate, a rotational speed of the rotor 6 is reduced through the worm 9a and the worm wheel 32. The rotational force of the worm wheel 32 is then outputted from the motor 1 via the output shaft 34. The rotational force of the output shaft 34 is transmitted to the wiper blades via the link mechanism, so that the wiper blades are driven to wipe the vehicle front glass. During the operation of the motor 1, the fan 12 that is rotated integrally with the rotor 6 circulates the air to cool an interior of the motor 1.

Furthermore, during the operation of the motor 1 (wiper system), a thrust load is applied to the rotatable shaft 9 toward the bottom portion 4e of the yoke 4. When the thrust load is equal to or below the predetermined value, the movement of the rotatable shaft 9 in the thrust direction is restricted by the Belleville spring 7, so that the engaging portion 24 of the fan 12 does not engage the annular portion 4c of the yoke 4. Thus, the rotation of the rotor 6 is not prevented, thereby allowing normal wiping operation of the wiper blades, while the Belleville spring 7 supports and cushions the thrust load applied on the rotatable shaft 9.

On the other hand, if there is some resistance, such as a resistance exerted by snow located on a wiping surface of the vehicle front glass, a large load greater than a load normally applied on the output shaft 34 is quickly applied on the output shaft 34. When the thrust load applied on the rotatable shaft 9 exceeds the predetermined value, the rotatable shaft 9 overcomes the biasing force of the Belleville spring 7 and moves in the axial (thrust) direction, so that the engaging portion 24 of the fan 12 engages the annular portion 4c of the yoke 4. As a result, a frictional force (braking force) developed by this engagement decelerates and finally stops the rotor 6 (rotatable shaft 9).

The embodiment set forth above provides the following characteristic advantages.

(1).During the operation of the motor 1 (wiper system), when a large thrust load that is larger than the predetermined value is applied on the rotatable shaft 9, the rotatable shaft 9 (rotor 6) is stopped, thereby preventing application of the large force (rotational force or inertial force of the rotor 6) on the connection (teeth) between the worm 9a and the worm wheel 32. Thus, in the motor 1, none of the worm 9a and the worm wheel 32 is required to have the excessively large strength that is greater than a corresponding strength normally required for preventing damage to the connection (teeth) between the worm 9a and the worm wheel 32. As a result, a material cost of the worm wheel 32, especially one made of a resin material, can be advantageously reduced. Furthermore, this allows a reduction in the weight of the worm wheel 32, thereby allowing improvement of a motor efficiency. In addition, the worm wheel and the entire gear housing can be made smaller.

(2) If each one of the worm 9a and the worm wheel 32 has the same strength as that of the previously proposed worm or worm wheel, the motor 1 can be modified to generate a larger torque by increasing a diameter of a coil (winding) wound around the armature 10. The increase in the torque of the motor 1 should not be a problem for the following reason. That is, as indicated by a characteristic line A in FIG. 2 which shows a relationship between a rotational speed and an output torque of such a larger torque motor, when the output torque of the motor exceeds a predetermined value Tb, the engaging portion 24 of the fan 12 engages the annular portion 4c of the yoke 4 to prevent generation of a larger torque. As a result, an actual maximum output torque T1 of the rotor 6 is limited to the maximum output torque T1 of the previously proposed smaller torque motor (indicated with a characteristic line B in FIG. 2), so that damages to the connection (teeth) between the worm and the worm wheel due to an excessive torque are advantageously prevented according to the present embodiment. Contrary to this, in the case of the motor previously proposed before the present invention, if the motor is modified to generate the larger torque, for instance by increasing a diameter of a coil wound around an armature, the motor will have, for example, a characteristic line C. Thus, such a motor has an increased maximum output torque T2. As a result, the connection (teeth) between the worm and worm wheel that have no increased strength will likely be damaged. Furthermore, even if the worm and the worm wheel indeed have increased strength, it is required to increase a strength of a relevant system (such as the link mechanism) that is operated by the output of the motor to withstand the torque T2. This results in an increase in the size and weight of the entire system.

If the diameter of the coil wound around the armature 10 is increased as described above, a resistance of the coil is reduced, thereby improving an efficiency of the motor and reducing heat generation by the coil. Furthermore, by increasing the torque of the motor 1, the rotational speed of the rotor 6 will have less fluctuations even if the load applied on the output shaft 34 shows slight fluctuations, for example, due to the presence of some small resistance on the wiping surface of the vehicle front glass. Thus, in such a wiper system, the rotor 6 rotates more stably to provide a desired wiping motion.

(3) Since the engaging portion 24 that engages the annular portion 4c of the yoke 4 is provided in the outer peripheral region of the fan 12, a larger frictional force (braking force) can be obtained when the engaging portion 24 engages the annular portion 4c of the yoke 4.

The embodiment set forth above can be modified as follows.

The engaging portion 24 acting as the rotor-side engaging portion and the annular portion 4c acting as the case-side engaging portion can be modified to any other suitable forms as long as they can engage each other based on the movement of the rotatable shaft 9 in the thrust direction and thereby brake, i.e., stop or decelerate-the rotatable shaft 9 (rotor 6). For instance, the motor 1 can be modified to a motor 51 shown in FIG. 3. In the motor 51, at a base (left side in FIG. 3) of a worm housing 52a of a gear housing 52, there is provided a case-side tapered portion 52b having a substantially conical shape and acting as a case-side engaging portion tapered toward the base. At a distal end of a rotatable shaft 53, there is provided a rotor-side tapered portion 53a having a substantially conical shape and acting as a rotor-side engaging portion tapered toward its distal end. A taper ratio of the case-side tapered portion 52b is substantially the same as that of the rotor-side tapered portion 53a. Furthermore, a plurality of radial grooves that extend in a generally radial direction of the rotor-side tapered portion 53a are circumferentially arranged in the rotor-side tapered portion 53a at equal angular intervals to increase a coefficient of friction between the rotor-side tapered portion 53a, and the case-side tapered portion 52b. Although the radial grooves are provided on the rotor-side tapered portion 53a in this embodiment, these radial grooves can be alternatively provided on the case-side engaging portion 52b. At an open end of the worm housing 52a, a Belleville spring 55 is provided to bias an outer ring of a ball bearing 54, which also has an inner ring secured to a middle portion of the rotatable shaft 53, toward a base end of the rotatable shaft 53. In the present embodiment, the case-side tapered portion 52b, the rotor-side tapered portion 53a and the Belleville spring 55 constitute frictional braking force generating means. Like the above embodiment, a spring constant of the Belleville spring 55 is chosen such that the rotor-side tapered portion 53a does not engage the case-side tapered portion 52b while the thrust load applied on the rotatable shaft 53 toward the case-side tapered portion 52b being equal to or smaller than a predetermined value and engages the case-side tapered portion 52b while the thrust load being larger than the predetermined value.

Figure 3:
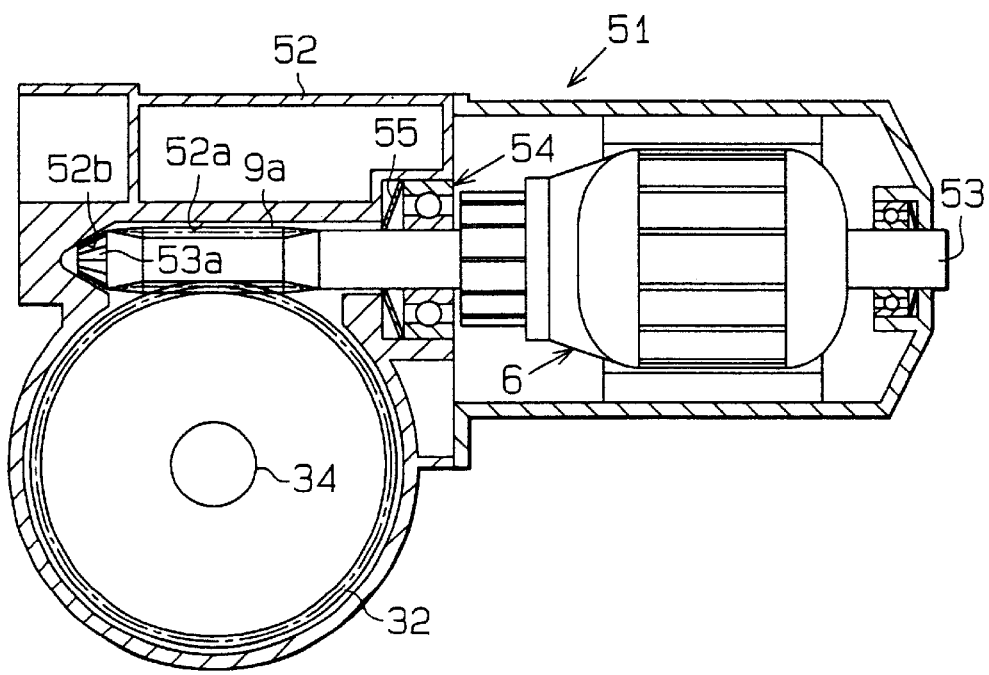
FIG. 3 is a schematic cross-sectional view for describing a modification of the motor.

The motor 51 is secured to the vehicle body in such a manner that when the worm wheel 32 (output shaft 34) rotates in a clockwise direction in FIG. 3, the wiper blades are driven to wipe the front glass.

In this arrangement, during the operation of the motor 51 (wiper system), when a thrust load larger than the predetermined value is applied on the rotatable shaft 53, the rotatable shaft 53 overcomes the biasing force of the Belleville spring 55 and moves in the axial (thrust) direction. Thus, the rotor-side tapered portion 53a engages the case-side tapered portion 52b. As a result, the rotor 6 (rotatable shaft 53) is decelerated and is finally stopped by the frictional force generated between the rotor-side tapered portion 53a and the case-side tapered portion 52b. In this way, advantages similar to those of the above embodiment discussed in the above sections (1) and (2) can be achieved. Furthermore, in this case, there is no need to provide the fan 12. Since each one of the case-side tapered portion 52b and the rotor-side tapered portion 53a extends at the oblique angle relative to the thrust direction, a contact surface area between the case-side tapered portion 52b and the rotor-side tapered portion 53a is increased, thereby exerting a larger frictional force (braking force). Furthermore, since the plurality of grooves are circumferentially arranged around the rotor-side tapered portion 53a, a larger frictional force (braking force) can be exerted upon engagement of the rotor-side tapered portion 53a with the case-side tapered portion 52b.

In the above instance, there are provided the case-side tapered portion 52b that is tapered toward the base of the worm housing 52a as well as the rotor-side tapered portion 53a that is tapered toward the distal end of the rotatable shaft 53. However, both the base inner surface of the worm housing 52a and the distal end surface of the rotatable shaft 53 can be modified to have a flat surface that extends perpendicular to the thrust (axial) direction to form the case-side engaging portion and the rotor-side engaging portion, respectively. Even with such an arrangement, a frictional force (braking force) is generated when the flat distal end surface (rotor-side engaging portion) of the rotatable shaft 53 engages the flat bottom inner surface (case-side engaging portion) of the worm housing 52a. Furthermore, in this instance, the case-side engaging portion and the rotor-side engaging portion can be easily manufactured. Also, existing component products can be used for this purpose, thereby allowing reduction of manufacturing costs.

Figure 4A:
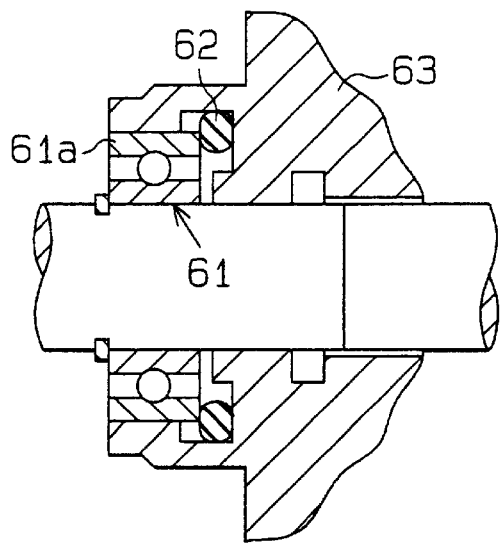
FIG. 4A is a schematic cross-sectional views for describing a modification of a biasing member.
Figure 4B:
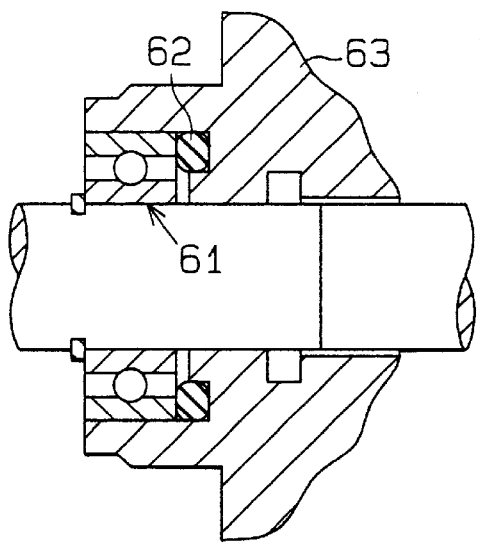
FIG. 4B is another schematic cross-sectional view for describing a modification of the biasing member.
Figure 5:
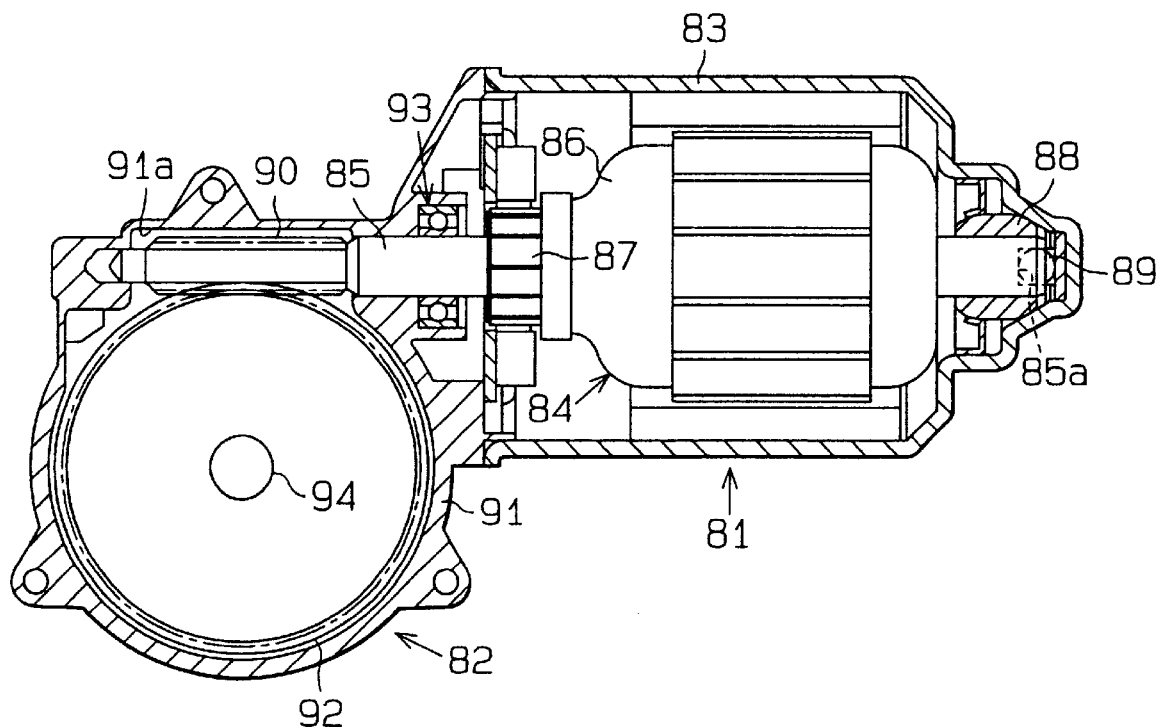
FIG. 5 is a schematic cross-sectional view for describing a previously proposed motor.

The Belleville springs 7 and 56 can be changed to any other suitable biasing member as long as such a member provides an biasing force similar to that of the Belleville spring 7 or 56. For instance, as shown in FIGS. 4A and 4B, in place of the Belleville spring 7 or 56, a rubber ring 62 having substantially the same outer diameter as that of an outer ring 61a of a ball bearing 61 can be provided. The rubber ring 62 can be arranged such that the rubber ring 62 is clamped between the outer ring 61a and a gear housing 63. Furthermore, in place of the Belleville spring 7 or 56, any other spring, such as a spiral spring, a conical spring, diaphragm spring or the like, can be used to bias the rotatable shaft. Even with such an arrangement, advantages similar to those set forth above can be achieved.

In the above embodiment, the engaging portion 24 acting as the rotor-side engaging portion and the annular portion 4c acting as the case-side engaging portion engage each other based on the movement of the rotatable shaft 9 in the thrust direction to decelerate and finally stop the rotor 6 (rotatable shaft 9) by the frictional force generated upon the engagement of the engaging portion 24 with the annular portion 4c. This arrangement can be modified as follows. That is, the rotor-side engaging portion and the case-side engaging portion can be modified to immovably engage each other in a rotational direction based on the movement of the rotatable shaft 9 in the thrust direction to stop the rotor 6. For instance, the case-side tapered portion 52b can be changed to an annular recess having diametrically opposing flat inner surfaces, and the rotor-side tapered portion 53a can be changed to an annular protrusion having diametrically opposing flat outer surfaces that are designed to engage with the diametrically opposing flat outer surfaces of the annular recess. Even with such an arrangement, the advantages similar to those described in the above sections (1) and (2) can be achieved.

In the above embodiment, each one of the motors 1 and 51 is described as the motor that is used in the wiper system and that is designed to rotate only in one rotational direction. However, for instance, each one of the motors 1 and 51 can also be provided as a motor that is used, for example, in a power window system and that is designed to rotate in both rotational directions. In such a-case, for instance, the annular portion 4c of the yoke 4, the engaging portion 24 of the fan 12, the Belleville spring 7, the case-side tapered portion 52b, the rotor-side tapered portion 53a and the Belleville spring 55 may be provided together, so that. the rotor 6 (rotatable shaft 9) can be stopped whenever a thrust load exerted on the rotatable shaft in either axial direction exceeds the predetermined value.

Additional advantages and modifications will readily occur to those skilled in the art. The invention in its broader terms is therefore, not limited to the specific details, representative apparatus, and illustrative examples shown and described.

What is claimed is:

1. A motor comprising:
  a motor case;
  a rotor contained in said motor case, said rotor including a rotatable shaft, said rotatable shaft having a worm;
  a worm wheel meshed with said worm, and
  frictional braking force generating means for braking said rotatable shaft with friction when a thrust load applied on said rotatable shaft exceeds a predetermined value; said frictional braking force generating means including:
    a case-side engaging portion provided on said motor case;
    a rotor-side engaging portion provided on said rotor for engaging with said case-side engaging portion based on movement of said rotatable shaft in a thrust direction of said rotatable shaft to brake said rotatable shaft; and
  thrust movement adjusting means for adjusting said movement of said rotational shaft in said thrust direction, wherein:
    said thrust movement adjusting means limits said movement of said rotatable shaft in said thrust direction to prevent said engagement of said rotor-side engaging portion with said case-side engaging portion when said thrust load applied on said rotatable shaft is equal to or smaller than said predetermined value;
    said thrust movement adjusting means allows said movement of said rotatable shaft in said thrust direction to allow said engagement of said rotor-side engaging portion with said case-side engaging portion when said thrust load applied on said rotatable shaft is larger than said predetermined value; and
    said thrust movement adjusting means is a biasing member that biases said rotatable shaft toward a position whereat said rotor-side engaging portion is disengaged from said case-side engaging portion.

2. A motor according to claim 1, wherein said biasing member is a spring.

3. A motor according to claim 1, wherein said biasing member is a Belleville spring.

4. A motor comprising:

a motor case;

a rotor contained in said motor case, said rotor including a rotatable shaft, said rotatable shaft having a worm and a cooling fan that is secured to and extends radially outwardly from said rotatable shaft;

a worm wheel meshed with said worm, and frictional braking force generating means for braking said rotatable shaft with friction when a thrust load applied on said rotatable shaft exceeds a predetermined value; said frictional braking force generating means including:

a case-side engaging portion provided on said motor case;

a rotor-side engaging portion provided on said rotor for engaging with said case-side engaging portion based on movement of said rotatable shaft in a thrust direction of said rotatable shaft to brake said rotatable shaft, said rotor-side engaging portion arranged in an outer peripheral region of said cooling fan; and thrust movement adjusting means for adjusting said movement of said rotational shaft in said thrust direction, wherein:

said thrust movement adjusting means limits said movement of said rotatable shaft in said thrust direction to prevent said engagement of said rotor-side engaging portion with said case-side engaging portion when said thrust load applied on said rotatable shaft is equal to or smaller than said predetermined value;

said thrust movement adjusting means allows said movement of said rotatable shaft in said thrust direction to allow said engagement of said rotor-side engaging portion with said case-side engaging portion when said thrust load applied on said rotatable shaft is larger than said predetermined value.

5. A motor comprising:

a motor case;

a rotor contained in said motor case, said rotor including a rotatable shaft, said rotatable shaft having a worm;

a worm wheel meshed with said worm, and frictional braking force generating means for braking said rotatable shaft with friction when a thrust load applied on said rotatable shaft exceeds a predetermined value; said frictional braking force generating means including:

a case-side engaging portion provided on said motor case;

a rotor-side engaging portion provided on said rotor for engaging with said case-side engaging portion based on movement of said rotatable shaft in a thrust direction of said rotatable shaft to brake said rotatable shaft, wherein each of said case-side engaging portion and said rotor-side engaging portion extends at an oblique angle relative to said thrust direction, said rotor-side engaging portion including a plurality of grooves circumferentially arranged in said rotor-side engaging portion; and thrust movement adjusting means for adjusting said movement of said rotational shaft in said thrust direction, wherein:

said thrust movement adjusting means limits said movement of said rotatable shaft in said thrust direction to prevent said engagement of said rotor-side engaging portion with said case-side engaging portion when said thrust load applied on said rotatable shaft is equal to or smaller than said predetermined value;

said thrust movement adjusting means allows said movement of said rotatable shaft in said thrust direction to allow said engagement of said rotor-side engaging portion with said case-side engaging portion when said thrust load applied on said rotatable shaft is larger than said predetermined value.

6. A motor according to claim 5, wherein said plurality of grooves are radial grooves that extend in a radial direction of said rotor-side engaging portion and that are circumferentially arranged in said rotor-side engaging portion at substantially equal angular intervals.

7. A motor comprising:

a motor case;

a rotor contained in said motor case, said rotor including a rotatable shaft, said rotatable shaft having a worm;

a worm wheel meshed with said worm, and frictional braking force generating means for braking said rotatable shaft with friction when a thrust load applied on said rotatable shaft exceeds a predetermined value; said frictional braking force generating means operative to counteract said thrust load exerted in either axial direction of said rotatable shaft.

8. A motor comprising:

a motor case;

a rotor contained in said motor case, said rotor including a rotatable shaft, said rotatable shaft having a worm;

a worm wheel meshed with said worm, and frictional braking force generating means for braking said rotatable shaft with friction when a thrust load applied on said rotatable shaft exceeds a predetermined value, said frictional braking force generating means includes:

a case-side engaging portion provided on said motor case;

a rotor-side engaging portion provided on said rotor for engaging with said case-side engaging portion based on movement of said rotatable shaft in a thrust direction of said rotatable shaft to brake said rotatable shaft; and thrust movement adjusting means for adjusting said movement of said rotational shaft in said thrust direction, wherein:

said thrust movement adjusting means limits said movement of said rotatable shaft in said thrust direction to prevent said engagement of said rotor-side engaging portion with said case-side engaging portion when said thrust load applied on said rotatable shaft is equal to or smaller than said predetermined value; and said thrust movement adjusting means allows said movement of said rotatable shaft in said thrust direction to allow said engagement of said rotor-side engaging portion with said case-side engaging portion when said thrust load applied on said rotatable shaft is larger than said predetermined value; and said thrust movement adjusting means is a biasing member that biases said rotatable shaft toward a position whereat said rotor-side engaging portion is disengaged from said case-side engaging portion, wherein said biasing member is a Belleville spring.

9. A motor comprising:

a motor case;

a rotor contained in said motor case, said rotor including a rotatable shaft, wherein:

said rotatable shaft of said rotor includes a cooling fan that is secured to and extends radially outwardly from said rotatable shaft; and frictional braking force generating means for braking said rotatable shaft by friction when a thrust load applied on said rotatable shaft exceeds a predetermined value, said frictional braking force generating means including:

a case-side engaging portion provided on said motor case;

a rotor-side engaging portion provided on said rotor for engaging with said case-side engaging portion based on movement of said rotatable shaft in a thrust direction of said rotatable shaft to brake said rotatable shaft, said rotor-side engaging portion arranged in an outer peripheral region of said cooling fan; and thrust movement adjusting means for adjusting said movement of said rotational shaft in said thrust direction, wherein:

said thrust movement adjusting means limits said movement of said rotatable shaft in said thrust direction to prevent said engagement of said rotor-side engaging portion with said case-side engaging portion when said thrust load applied on said rotatable shaft is equal to or smaller than said predetermined value; and said thrust movement adjusting means allows said movement of said rotatable shaft in said thrust direction to allow said engagement of said rotor-side engaging portion with said case-side engaging portion when said thrust load applied on said rotatable shaft is larger than said predetermined value.

\* \* \* \* \*